Patented Nov. 17, 1925.

1,561,525

UNITED STATES PATENT OFFICE.

RICHARD W. SEABURY, OF BOONTON, NEW JERSEY, ASSIGNOR, BY MESNE ASSIGNMENTS, TO UNION CARBIDE AND CARBON RESEARCH LABORATORIES INC., OF LONG ISLAND CITY, NEW YORK, A CORPORATION OF NEW YORK.

PLASTIC MOLDING.

No Drawing. Application filed February 16, 1921. Serial No. 445,520.

*To all whom it may concern:*

Be it known that I, RICHARD W. SEABURY, a citizen of the United States, residing at Boonton, in the county of Morris and State of New Jersey, have invented certain new and useful Improvements in Plastic Molding, of which the following is a specification.

This invention relates to the art of plastic molding, and comprises a novel molding composition, and the method involved in the manufacture of the molded articles.

My novel composition, in the preferred embodiment of the invention, comprises a phenolic condensation product of the type which is rendered infusible by sufficient application of heat; and a vulcanizable rubber or equivalent composition; these two substances both serving as binders for an inert filling material, and both having undergone such preliminary conditioning or curing that they may be simultaneously transformed in a single molding operation to the final or desired state.

It is well known that phenolic condensation products may be molded in hot presses under properly controlled conditions of time, temperature and pressure, and discharged from the mold, either hot or cold as desired, in finished state. It is also well understood that vulcanizable rubber compositions, including those of the hard rubber type, may be molded in a somewhat similar manner, although under very different specific conditions. According to this invention in its preferred embodiment, the compositions containing the phenolic condensation product and the rubber, respectively, are separately treated in such manner as to advance, to a predetermined point, the condensation of the phenolic product on the one hand, and the vulcanization of the rubber on the other; this predetermined point being such that the two compositions may then be mixed and the transformation of the mixture completed in a single rapid operation, preferably in an automatic press.

My invention is of course applicable to the manufacture of molded articles of every type for which such compositions are adapted; but it is applicable with particular advantage to certain special articles of which battery jars and high-tension current distributors may be regarded as types.

In the case of battery jars it has been found that the phenolic condensation product mixtures yield a jar which is mechanically stronger than the ordinary hard rubber jars, but is chemically less resistant to the electrolyte in the active battery. Battery jars molded according to this invention are mechanically superior to the hard rubber jars and chemically superior to the jars made from the phenolic condensation product.

In the case of current distributors of the type in which a brush is caused to slide over an insulating surface between molded-in metal contacts, the desirable mechanical strength of the phenolic condensation product composition cannot in all cases be availed of, by reason of the tendency of the material to form conductive paths, due to carbonization under the electric spark. The molded articles made according to this invention exhibit decided superiority as regards tendency to carbonize, while possessing the desired mechanical strength.

For a full understanding of my invention I will now describe the same by reference to one specific example, it being understood that the invention is not restricted to the particular manipulations, ingredients, or proportions of ingredients mentioned therein.

Naturally the filling and other components mentioned may be employed in more or less varying proportions, and may be replaced wholly or in part by other materials which may be better adapted for any particular application or use of the molded article.

A typical rubber mixture may comprise:

| | Parts. |
|---|---|
| Washed and dried crude rubber | 24 |
| Sulfur | 12 |
| Magnesia | 2 |
| Ground silica or tripoli flour | 40 |
| Cosmic black | 10 |
| Gilsonite | 12 |

The above ingredients may be mixed on the hot rolls of a rubber mixing mill, and the resulting compound roughly sheeted into slabs ¼″ thick, and vulcanized for three hours at a temperature of about 145° C. When cold, the vulcanized slabs are broken up into small pieces, reduced to dust in a pulverizer, and sifted through a sieve of about 50 mesh. This material, referred to for convenience as hard rubber dust, is now ready for mixture with the phenolic condensation product which may be prepared as follows:

40 parts by weight of the phenolic condensation product known as bakelite, in a solid but initial or so-called "A" stage of condensation, is broken into fine pieces, and ground with 20 parts of silica or tripoli flour, 30 parts of wood-flour, 1 part of wax and 9 parts of cosmic black. The grinding may be carried out in a ball mill preferably with the addition of just sufficient alcohol to assist the subsequent flaking of the mixture on hot rolls, the mixing and grinding requiring about eight hours. The charge is passed through mixing rolls at about 140° C. to drive off solvent, and to advance the condensation to or toward the intermediate or so-called "B" stage. When cold, the material is broken up and ground for about six hours in a ball mill.

1 part of the hard rubber dust as first described is mixed with 1 part of the phenolic condensation product mixture, and the whole is ground and mixed together in a ball mill for another four hours, after which the material, now in the form of a dark colored powder, is ready for molding.

The molding process is carried out in hardened steel molds made exactly to the desired shape. The material is weighed out and placed in the lower section of the mold, which is closed by the top section or plunger and pressed into final shape in a hydraulic press under a pressure of about two thousand pounds per square inch. While subject to this pressure the material in the mold is also subjected to a temperature of about one hundred and sixty degrees centigrade for fifteen minutes or less, depending upon the size and shape of the mold.

The piece is taken out of the mold after it has been cooled down to about one hundred degrees centigrade and is allowed to cool, when it is ready for use.

It is apparent from the above description that both the bakelite and the rubber act as binding materials in the final product, which is molded in powder form in the same kind of positive steel mold as is ordinarily used for hot molding synthetic resins, and is in no sense a plastic which could be molded in flash or overflow molds. Also that in the preferred embodiment of the invention each of the binding materials undergoes a separate and distinct cure or conditioning treatment, which with the final cure in the mold, produces a composition with maximum mechanical strength, smooth surface, minimum of free sulfur, and accurate to dimension. Molded articles prepared from this composition are entirely suitable for battery jars, because they are inert under the action of electrolyte; and the index of carbonization under the electric spark is so low that they can be used to advantage for distributors of high tension current on electrical ignition systems.

The foregoing detailed description has been given for clearness of understanding only, and no unnecessary limitations should be understood therefrom, but the following claims should be construed as broadly as permissible, in view of the prior art. For example, while in my preferred operation both the phenolic condensation product (or the reactive mixture yielding the same) and the vulcanizable rubber composition are separately conditioned or cured under predetermined conditions to yield in the final quick-molding operation a molded article of maximum mechanical strength and chemical resistivity, it may be possible to omit the conditioning of one or the other of these binders, as by the choice of a very rapidly-reacting mixture; and such procedure is regarded as falling within my invention, which contemplates broadly the association with the inert filling material of binders of the types described, these binders existing in such state of advancement or cure as will permit their simultaneous transformation by a hot-molding operation into a final product having the required mechanical and chemical characteristics for the particular purpose in view.

I claim:

1. A molding composition comprising discrete particles containing a phenolic condensation product and filler in intimate admixture with particles containing a vulcanizable rubber composition and a filler.

2. Method of making molded articles comprising an infusible phenolic condensation product and vulcanized rubber in association with suitable filling materials, consisting in separately compounding a reactive substance capable of yielding an infusible phenolic condensation product, and vulcanized rubber, with filling material; separately treating the resulting mixtures to advance the transformation to a degree short of completion; then combining the said mixtures and completing the transformation by further application of heat.

3. Method of making molded articles comprising an infusible phenolic condensation product and vulcanized rubber in association with suitable filling materials, consisting in separately compounding a reactive substance capable of yielding an infusible phenolic condensation product, and vulcanized rubber, with filling material; separately treating the resulting mixtures to advance the transformation to a degree short of completion; then combining the said mixtures and completing the transformation by hot-pressure molding.

4. Method of making molded articles comprising an infusible phenolic condensation product and vulcanized rubber in association with suitable filling materials, consisting in separately compounding a reactive substance capable of yielding an infusible phenolic condensation product, and vulcanized rubber, with filling material, said binders existing in such state of advancement or cure as will permit their simultaneous transformation by a hot-molding operation into a final product having the required mechanical and chemical characteristics for the particular purpose in view; then combining the said mixtures and completing the transformation by further application of heat.

In testimony whereof, I affix my signature.

RICHARD W. SEABURY.